Nov. 27, 1934.  A. LYSHOLM  1,981,872
ELASTIC FLUID TURBINE
Filed March 21, 1932  3 Sheets-Sheet 2

Fig. 2.

INVENTOR
Alf Lysholm
BY
ATTORNEY

Nov. 27, 1934.  A. LYSHOLM  1,981,872
ELASTIC FLUID TURBINE
Filed March 21, 1932    3 Sheets-Sheet 3
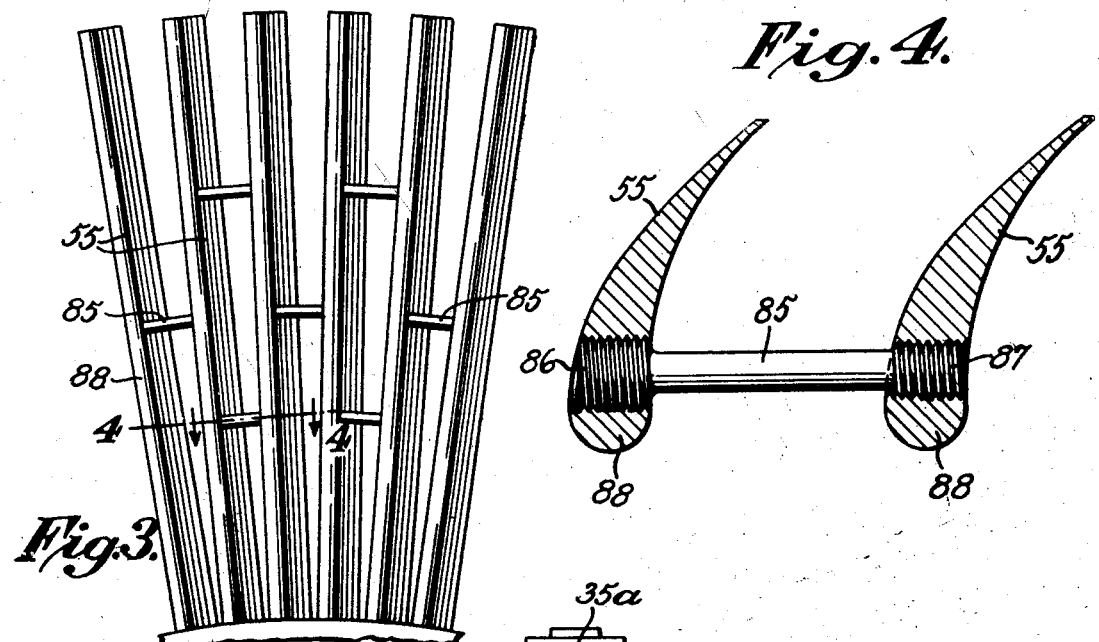
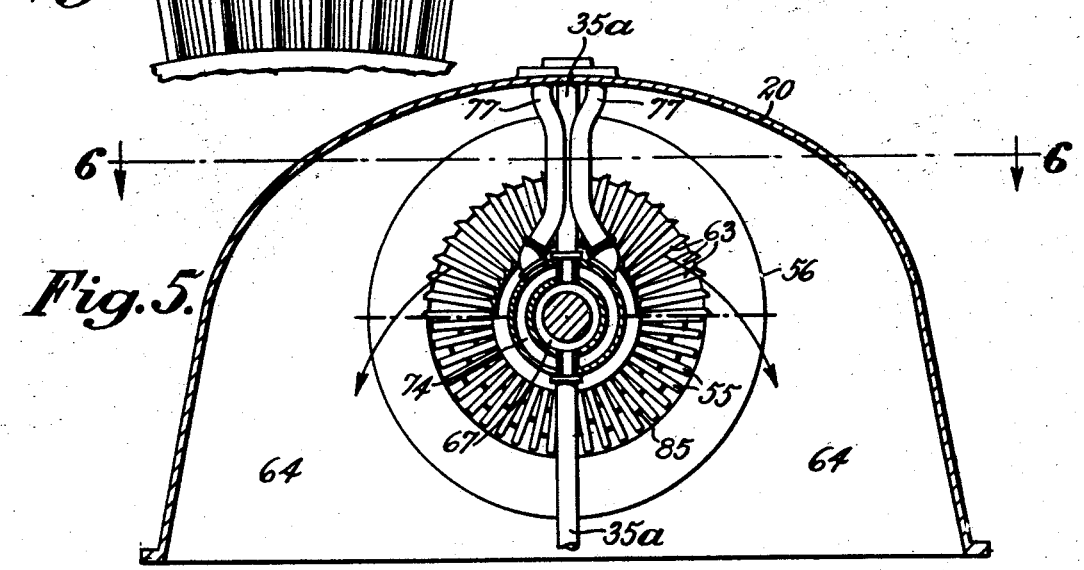
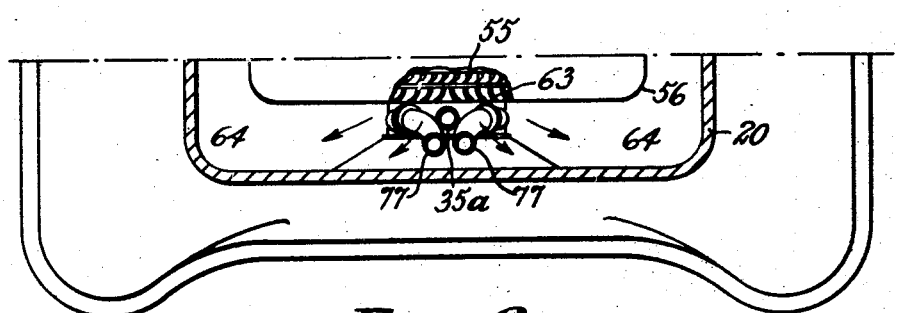
INVENTOR
Alf Lysholm
BY
ATTORNEY Patented Nov. 27, 1934

1,981,872

UNITED STATES PATENT OFFICE 1,981,872

ELASTIC FLUID TURBINE

Alf Lysholm, Stockholm, Sweden, assignor to Aktiebolaget Ljungstroms Angturbin, Stockholm, Sweden, a joint-stock company of Sweden Application March 21, 1932, Serial No. 600,133
In Sweden March 24, 1931

15 Claims. (Cl. 253—16.5)

The present invention relates to elastic fluid turbines and has particular reference to radial flow turbines adapted to be built in large sizes and of the type having axial flow blade systems through which low pressure motive fluid passes after being exhausted from the radial flow blade system or systems.

The principal object of the invention is to improve upon constructions heretofore employed in turbines of the above character so that axial flow blade systems of large capacity and high efficiency may be used without involving undue complication of the turbine structure.

The nature of the invention and the more detailed objects thereof, and also the manner in which the invention may be carried into effect, may best be understood from a consideration of the following description of a preferred form of turbine embodying the invention and illustrated in the accompanying drawings forming a part of this specification.

In the drawings:

Fig. 2 is a longitudinal central section, on an enlarged scale, of a part of the structure shown in Fig. 1;

Fig. 3 is a still further enlarged end elevation of a portion of the turbine blading;

Fig. 4 is a section taken on the line 4—4 of Fig. 3;

Fig. 5 is an end view taken generally along the line 5—5 of Fig. 1, parts being broken away and omitted for the sake of clearness, and, Fig. 6 is a section taken generally on the line 6—6 of Fig. 5.

Figure 1:
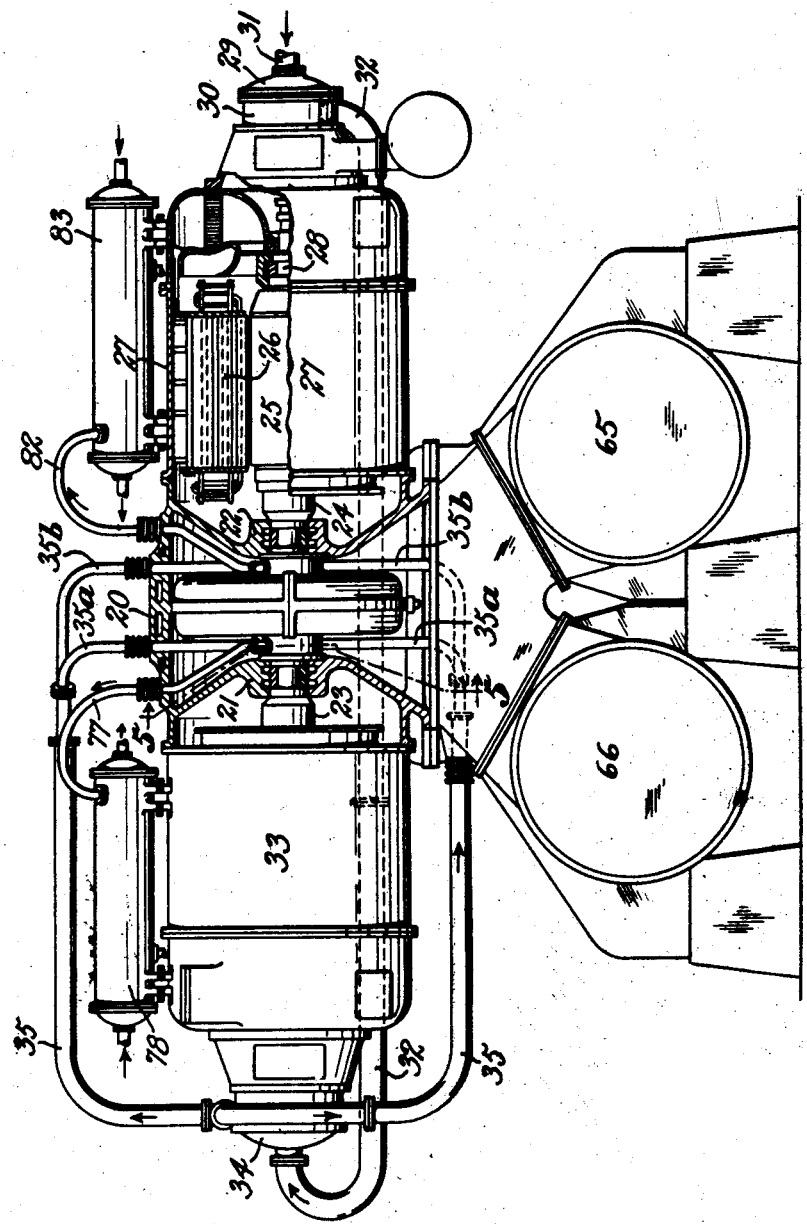
Fig. 1 is a more or less diagrammatic side elevation, partly in section, of a turbo-generator embodying the invention.

Turning now more particularly to Fig. 1, the turbo-generator chosen for illustration is of the double rotation type and comprises an outer central turbine housing 20 providing bearings 21 and 22 for the inner ends of shafts 23 and 24, respectively, which shafts are adapted to rotate in opposite directions. Each of the shafts 23 and 24 carry the rotors of electric generators, the rotor of one of the generators being indicated at 25. The stationary windings 26 of the generator of which the rotor 25 forms a part are supported by a casing 27 overhung from the turbine housing 20, the extension of this casing providing a bearing 28 for the shaft 24. Shaft 24 is extended beyond bearing 28 and the extended end of this shaft is connected to an overhung high pressure turbine section 29, the casing 30 of which is supported from the casing 27. Turbine section 29 is advantageously of the single rotation radial flow type, high pressure motive fluid being admitted thereto through conduit 31 and exhausted therefrom through the conduit 32. A second generator casing 33 is overhung on the side of the turbine housing 20 opposite casing 27 and encloses a generator similar to that shown in casing 27. The outer end of shaft 23, which shaft is extended through the casing 33, is connected to a second turbine section 34 which is advantageously of the same type as turbine section 29. The turbine section 34 is preferably operated as an intermediate pressure turbine, the motive fluid exhausted from turbine 29 being admitted to turbine section 34 through the conduit 32. Motive fluid exhausted from turbine section 34 is conducted to the low pressure section through two conduits 35 arranged in parallel with respect to flow of motive fluid. It will be appreciated that a single conduit may replace the two conduits shown. Each of the conduits 35 is preferably divided into branches 35a and 35b which branches pass through the turbine housing 20 and deliver motive fluid to the low pressure section adjacent to the axis of rotation of the turbine, in a manner to be described in further detail.

Turning now to Fig. 2, the low pressure turbine section comprises rotors indicated generally at 36 and 37 fixed to the inner ends of shafts 23 and 24, respectively. The inner members 38 and 39 of these rotors carry the blade systems 40 and 41 of radial flow blades, the construction of which may be of conventional type. The outer rotor members 42 and 43 are connected by the usual radially extending bolts to the inner rotor members 38 and 39, respectively. The outer rotor members, in the embodiment shown, carry the blade rings forming a third radial flow blade system designated generally at 44 and providing two radially extending passages 45 and 46 for motive fluid exhausted through the central radial flow passage 47 provided by the blade systems 40 and 41. Motive fluid exhausted from passages 45 and 46 passes through rings of stationary guide blades 48 and 49 to chambers 50 and 51 from which it is adapted to flow axially through the axial flow blade systems designated generally at 52 and 53. The axial flow blade systems are similar in construction and therefore only one need be described in detail. Considering the axial flow system to the left in Fig. 2, it will be seen that the outer rotor member 42 is bifurcated at its outer periphery, the parts of the bifurcation carrying the rows of moving axial flow blades 54 and 55, the latter blades constituting the last row of moving blades of the turbine.

As will be seen from the figure, blades 54, comprising the next to the last expansion stage in the turbine, are of much less radial extent than are blades 55 comprising the last expansion stage. In the example illustrated, blades 54 are approximately half the radial extent of blades 55.

Surrounding the blade systems forming the low pressure section of the turbine is a stationary annular casing 56, this casing being hollow and containing coils such as indicated at 57 for a purpose to be described later.

Casing 56 provides support for a ring of stationary guide blades 58 the radially inner ends of which are secured to an annular ring member 59 having a peripherally extending channel 60 therethrough. Channel 60 is connected to the interior of the casing 56 by means of a plurality of passages 61 extending through the fixed guide blades 58. As will be observed from the figure, the moving blades 54 are situated radially inside a part of the member 59 and this member further serves as a support for a ring of stationary guide blades 62 which extend radially inwardly therefrom between the blades 54 and 55. A ring of stationary guide blades 63 extends radially inwardly from the casing 56 adjacent to the outlet side of the row of blades 55.

Motive fluid passes from the rings of guide blades 63 to the exhaust chamber 64 in the main turbine housing 20 from which it passes to the condensers 65 and 66 (Fig. 1) which condensers preferably form part of the supporting structure for the housing 20.

Motive fluid is admitted to the low pressure section of the turbine from the branch conduits 35a and 35b which are connected to the chambers 67 and 68, respectively. These chambers communicate respectively through channels 69 and 70 with the central space 71 from which motive fluid is delivered to the channel 47.

From Fig. 2 it will be seen that a series of ports or ducts 72 extending through the rotor member 38 serve to connect the space between the blade systems 40 and 41 with the annular space 73, which space is in turn connected with the space 74 by means of suitable passages 75 through the labyrinth packing 76. Motive fluid bled from the turbine between the blade systems 40 and 41 to the space 74 is conducted from the latter space through conduits 77 (see Figs. 1 and 5) to a heat exchanger indicated generally at 78.

A portion of the motive fluid flows from between the radial flow blade systems 41 and 44 in the direction indicated by the arrow A in Fig. 2, between the spaced inner and outer rotor members 39 and 43, and through suitable ports 79 in labyrinth packing 80 to the space 81. Space 81 is connected by means of conduits 82 similar to conduits 77 and leading to a second heat exchanger 83.

Heat exchangers 78 and 83, to which motive fluid is bled from intermediate pressure stages in the turbine, and the heat exchanger formed by the inner casing 56 and coils 57, are advantageously employed as a stage heating device for the fluid employed for driving the turbine.

In the case of a steam operated turbine, the several heat exchangers are most advantageously employed to preheat feed water for the steam generators. In other types of turbines, such for example as constant pressure gas turbines driven by gases of combustion, the heat exchangers may advantageously operate as heat exchange units for returning to the motive fluid or to one of the constituents thereof, heat from a portion of the motive fluid which has been expanded in one or more stages of the turbine.

Since motive fluid bled from the turbine to the heat exchangers is supplied to the different heat exchangers at different pressures and temperatures, it is to be preferred to connect the heat exchangers in series with respect to the flow of the fluid to be heated, so as to provide stage heating thereof. It will be appreciated, however, that such connection of the heat exchangers is not essential and that one or more of the same may be connected in parallel. In view of the fact that the heat exchangers may be connected in different ways and also in view of the fact that the connections between these heaters for the delivery to and discharge therefrom of fluid to be heated is a matter of merely elementary mechanical skill, the several conduits required for this purpose have been omitted from the drawings in order to simplify the same.

Referring again to Fig. 2, it will be observed that the blades 55, comprising the last row of moving axial flow blades, have a very considerable radial extent. Due to this fact, there is a very considerable difference in the peripheral velocity between the radially outer portions of these blades and the radially inner portions thereof. Under these conditions, special provision must be made if these blades are to operate efficiently because of the difference which would be present in the relative inlet angle of the motive fluid with respect to the radially inner and outer portions of the blades if the blades were of uniform section throughout their length and received motive fluid throughout their length from the same supply conduit.

In cases where this difficulty has arisen in prior forms of construction, due to material differences in peripheral velocity between different portions of the same blades, it has been suggested that the blades be twisted or warped about their longitudinal axes, in order to compensate for the differences in peripheral velocity between the several portions of the blades, but this arrangement is difficult to effect practically.

In accordance with the present invention, long axial flow blades are made use of in the last expansion stage by dividing the motive fluid discharged from the radial flow system (or a part thereof) to an axial flow blade system and by providing for one of the portions of the motive fluid so divided a path of flow to the last row of moving blades different from the path of flow of the remaining portion or portions, each portion being delivered to a different part of the last row of moving blades at an angle and with an absolute velocity such that a proper relative inlet angle of the motive fluid is obtained with respect to the entire length of the blades in the last moving row. In the embodiment illustrated, this is effected by causing the portion of the motive fluid flowing through the channel indicated by the arrow B to pass from the chamber 50 between the guide blades directly to the outer portions of the blades 55. With the mean peripheral velocity of the outer portions of the blades 55 known, it will be evident that the guide blades 58 may be arranged to give to the motive fluid the proper relative inlet angle. This angle will vary slightly as between the inner and outer parts of the outer portions of the blades but such variation will be comparatively slight and will not seriously affect the efficiency of operation of the outer portions of the blades.

The portion of the motive fluid flowing through the channel indicated by arrow C is caused to flow from the chamber 50 through the row of moving blades 54 and the guide blades 62 before it reaches the inner portions of the blades 55. As will be readily understood by those skilled in the art, the interposition of the next to the last row of blades 54 and the guide blades 62 between chamber 50 and the last row of moving blades 55 permits delivery of the motive fluid to the inner portions of the latter blades at a relative inlet angle suitable to obtain high efficiency from these portions of the blades.

As will further be noted from Fig. 2, the motive fluid, prior to entering the axial flow blade system, is altered with respect to its direction of flow. When the motive fluid is steam, it will contain a certain amount of moisture by the time it reaches the chamber 50 due to its loss of heat because of expansion in the preceding turbine stages. The change in direction of this moist steam will cause the moisture to be thrown radially outwardly, the steam having the greatest moisture content tending to flow through the channel B. A large proportion of moisture and very moist steam is bled from the turbine prior to entry of the steam between the fixed guide blades 58, this moisture laden steam being admitted through ports 84 to the interior of casing 56 where its heat is given up to the fluid in the coils 57. In this connection, it is to be noted that due to the arrangement by which the steam flowing from chamber 50 is divided into different portions, the blades 55 may be of such form as to advantageously pass steam containing a considerable amount of moisture. Ordinarily steam passing through the channel B will contain considerable moisture remaining after the separation and removal of moisture and moisture laden steam through the ports 84.

Moisture in that portion of steam flowing through channel C will also tend to be thrown radially outwardly and will find its way to the channel 60 in the ring member 59 from which channel this moisture and moisture laden steam will be delivered to the interior of the casing 56 through the passages provided in the stationary guide blades 58.

In view of the relatively great radial length of the blades 55, it is desirable to tie them peripherally so as to provide rigidity to the structure and to prevent undesirable vibration of the blades. An arrangement for effecting this is shown in Figs. 3 and 4 and may advantageously comprise a series of staggered peripherally extending bolts 85 having tapered threaded ends 86 and 87 adapted to seat in suitable threaded sockets in the thickened inlet portions 88 of the blades 55. This arrangement offers the minimum obstruction to the flow of motive fluid which is likely to produce turbulence of flow thereof and consequently offers the minimum impairment to the efficiency of the blading. From Fig. 4 it will be observed that the blading is preferably of the type having thickened and well rounded inlet portions, which type of blading lends itself particularly to the use of peripheral anchoring means such as bolts 85 and which, moreover, is particularly suitable for use in blades of great radial length since blading of this section is relatively insensitive insofar as efficiency is concerned to variations in the relative inlet angle of the motive fluid. Also this type of blading is particularly suited to withstand the tendency of a moisture laden motive fluid to erode the blading. While blades of the above type have been specifically shown only in conjunction with the last row of blades 55, it will be understood that the above described type of blade may be employed to advantage for blades such as blades 54 and also for some or all of the blades in the radial flow blade systems.

The blading employed in the axial flow blade system just described is of the reaction type and with respect to such blading, the "Parsons characteristic value" or Parsons figure is indicative of efficiency (see Loewenstein's translation of Stodola "Steam and Gas Turbines" 6th edition, page 254). This value is in the nature of a comparator and is represented by the equation $\Sigma u^2/\lambda$ in which $\Sigma u^2$ is the sum of the squares of the blade speeds "$u$" and $\lambda$ is the adiabatic heat drop through the blading.

With an arrangement such as that shown in Fig. 2, it is possible to construct a turbine in which the factor $\Sigma u^2$ for the blades in the passage B is equal to the factor $\Sigma u^2$ for the blades in the passage C. In other words, the sum of the squares of the mean speed of the outer portions of blades 55 can be made equal to the sum of the squares of the mean speed of the inner portions of blades 55, plus the sum of the squares of the mean speed of blades 54. It is further possible to construct the blading so that the adiabatic heat drop through each of passages B and C is the same, from which it follows that a Parsons figure for the passage B can be obtained which is equal to the Parsons figure for the passage C. Since the Parsons figure is indicative of efficiency, it follows that equal efficiencies for passages B and C may be obtained.

It will be evident that within the scope of the invention the number of separate paths of flow for motive fluid to the last row of moving blades in the axial flow blade system need not be limited to two.

While as hereinabove stated, it is possible to obtain a Parsons figure for the passage B which is as high as the Parsons figure for the passage C, I have found that because of the difference in the quality of steam in the two passages, that is, the greater moisture content in the steam in passage B as compared with the steam in passage C, it is preferable to construct the blading in the outer passage B so that the Parsons figure for this passage is less than the Parsons figure for the passage C. If, in a construction such as that illustrated, in which two passages are employed, a value of 2800 for the Parsons figure for the inner passage is suitable, a value of 1750 for the Parsons figure for the outer passage will be found to be most suitable. In considering the foregoing Parsons figure, the factor "$u$" is expressed in terms of meters per second and the factor $\lambda$ in terms of kilogram calories. If the value of the Parsons figure for the outer channel is most advantageously less than the Parsons figure for the inner passage, it will be evident that the factor $\Sigma u^2$ for the outer passage should be less than the factor $\Sigma u^2$ for the inner passage, since both passages receive motive fluid from a common chamber and discharge motive fluid to a common chamber, wherefore, the adiabatic heat drop through the two passages should be the same. In accordance with the present invention, the value for $\Sigma u^2$ for the outer passage is at least 0.7 of the value of $\Sigma u^2$ for the inner passage. Preferably, the value of $\Sigma u^2$ for the outer passage is from 0.8 to 0.9 of the value of $\Sigma u^2$ for the inner passage.

The Parsons figure for the two passages may, of course, vary. The value of the Parsons figure for the outer passage should be at least 0.7 and preferably from 0.8 to 0.9 of the value of the Parsons figure for the inner passage. As noted above, it is possible to make the Parsons figures for the two passages the same but this is not the most desirable relation when there is variation in the moisture content of a motive fluid such as steam.

In order to effect efficient flow of motive fluid from the guide blades 63 through the space 64 to the conduits leading to the condenser or condensers, the last guide blades in ring 63 are preferably arranged as shown in Fig. 6 so as to divert the motive fluid in the general direction of the arrows shown in this figure and also in Fig. 5. As will be observed from Fig. 6, the blades 73 to the right of the center line of the figure have their outlet portions curved to the right while the blades to the left of the center line of the figure have their outlet portions curved to the left, thus dividing the motive fluid exhausted from the guide blades into two more or less distinct streams which can flow to the outlet of the turbine housing with the minimum of turbulence and consequent frictional loss.

From the foregoing description, it will be evident that by employing a construction embodying the present invention, a turbine of the character described may be made with an axial flow blade system comparable in simplicity with axial flow blade systems of the type heretofore employed but capable of efficiently expanding a very much greater volume of motive fluid than can be expended in prior forms of construction with anything approaching comparable efficiency.

Obviously, many changes and modifications may be made in the structure without departing from the spirit or scope of the invention as defined in the appended claims which are to be considered as including all structures falling within their terms when construed as broadly as is consistent with the state of the prior art.

What is claimed is:

1. In a turbine of the character described, a radial flow blade system, an axial flow blade system adapted to receive motive fluid discharged from the radial flow blade system, and means providing radially separated inner and outer passages for flow of motive fluid through said axial flow blade system, said axial flow blade system comprising a row of moving blades having blade portions in each of said passages and a row of moving blades situated in and confined to the radially inner of said passages.

2. In a turbine of the character described, a radial flow blade system, an axial flow blade system adapted to receive motive fluid discharged from the radial flow blade system, said axial flow blade system comprising a plurality of rows of moving blades including a last row of moving blades of relatively great radial extent, and means for causing motive fluid discharged from said radial flow blade system to flow through radially different paths to radially different portions of said last row of moving blades, the next to the last row of moving blades being situated in and confined to the radially inner of said separate paths of flow.

3. In a turbine of the character described, a radial flow blade system, an axial flow blade system adapted to receive motive fluid discharged from the radial flow blade system, said axial flow blade system comprising a last row of moving blades of relatively great radial length and a next to last row of moving blades of relatively small radial length, a row of stationary guide blades situated radially outside said last mentioned moving blades for guiding motive fluid to the radially outer portions of said first mentioned moving blades, and a second row of stationary guide blades situated axially between the second mentioned moving blades and the radially inner portions of the first mentioned moving blades.

4. In a turbine of the character described, a rotor comprising inner and outer rotor members, said outer rotor member carrying a plurality of rows of axial flow blading at its outer periphery, one of said rows of axial flow blading comprising blades having materially greater radial length than the radial length of the blades in the row on the inlet side thereof, a stationary outer element and a plurality of rows of guide blades carried by said stationary element, there being a row of guide blades radially outside the second mentioned row of moving blades and a second row of guide blades situated radially inwardly of the first mentioned row of guide blades and axially between the first mentioned and the second mentioned rows of moving blades.

5. In a turbine of the character described, a rotor comprising inner and outer rotor members, said outer rotor member carrying a plurality of rows of axial flow blading at its outer periphery, one of said rows of axial flow blading comprising blades having materially greater radial length than the radial length of the blades in the row on the inlet side thereof, a stationary outer element, a plurality of rows of guide blades carried by said stationary element, there being a row of guide blades radially outside the second mentioned row of moving blades and a second row of guide blades situated radially inwardly of the first mentioned row of guide blades and axially between the first mentioned and the second mentioned rows of moving blades, and an annular element separating the two rows of guide blades.

6. A turbine of the character described comprising a radial flow blade system, an axial flow blade system adapted to receive motive fluid from the radial flow blade system, an annular hollow casing radially outside said systems, said radial flow blade system comprising a last row of moving blades of relatively great radial length, a next to last row of moving blades of materially lesser length, and stationary guide blade means carried by said casing, said means comprising a row of guide blades radially outside said next to last row of moving blades and a second row of guide blades supported by the first mentioned row of guide blades and situated axially between the last row of moving blades and the next to last row of moving blades, said first mentioned row of guide blades having passages therethrough for conducting condensate of motive fluid from a zone adjacent the outer ends of said next to last row of moving blades to said casing.

7. A turbine of the character described comprising a radial flow blade system, an axial flow blade system adapted to receive motive fluid from the radial flow blade system, a stationary element radially outside of said systems, said axial flow blade system comprising a last row of moving blades of relatively great radial length and a next to last row of moving blades of substantially lesser radial length, means for dividing motive fluid discharged from the radial flow blade system into radially separated paths of flow including radially different portions of the blades in the last row of moving blading, the blades in said next to last row of moving blades being situated in and confined to the radially inner of said separate paths of flow and guide blade means carried by said stationary element, said guide blade means comprising a row of guide blades on the discharge side of the last row of moving blades, the blades in the guide blade row being divided into at least two groups adapted to direct the motive fluid discharged therefrom in relatively different directions.

8. In a turbine of the character described, comprising a radial flow blade system, an axial flow blade system adapted to receive motive fluid from the radial flow blade system, and means providing radially separated inner and outer passages for flow of motive fluid through said axial flow blade system, said axial flow blade system comprising a row of moving blades having blade portions in each of said passages and a row of moving blades situated in and confined to the radially inner of said passages and the diameters of the moving blading and the mean diameters of the passages being so related that the sum of the squares of the speed of the blading in the radially outer passage is at least 0.7 of the sum of the squares of the speed of the blading in the radially inner passage.

9. In a turbine of the character described, a radial flow blade system, an axial flow blade system adapted to receive motive fluid discharged from the radial flow blade system, said axial flow blade system comprising a last row of moving blades of relatively great radial extent and a next to last row of moving blades of lesser radial extent, and means for dividing the motive fluid discharged from said radial flow blade system into radially separated paths of flow, the blades of said last row being situated in both of said paths of flow and the blades of said next to last row being situated in and confined to the radially inner of said paths of flow, the mean diameter of the portions of the blades in said last row situated in the radially outer of said paths of flow, the mean diameter of the portions of the blades in said last row situated in the inner of said paths of flow and the mean diameter of the blades in said next to last row being so related that the sum of the square of the blade speed of the portions of the blades in the radially outer passage is equal to at least 0.7 of the sum of the squares of the blade speeds of the blading situated in the inner of said paths of flow.

10. A turbine of the character described comprising a radial flow blade system, an axial flow blade system adapted to receive motive fluid from the radial flow blade system, means for dividing motive fluid discharged from the radial flow blade system into radially separated inner and outer passages, said axial flow system comprising a last row of moving blades having outer portions situated in the radially outer of said passages and inner portions situated in the radially inner of said passages, a next to last row of moving blades situated in and confined to the radially inner of said passages and a row of stationary guide blades in the radially inner of said passages and axially between said rows of moving blades, the blading situated in said passages being so proportioned with respect to the different passages that the Parsons figure for the blading in the outer passage is at least 0.7 that of the Parsons figure of the blading in the inner passage.

11. In a turbine, two rotors adapted to rotate in opposite directions, each of said rotors carrying rings of blades cooperating with rings of blades of the other rotor to form a radial flow blade system and at least one of said rotors carrying a plurality of rows of blades adapted to cooperate with stationary blades to form an axial flow blade system, and means for causing motive fluid discharged from the radial flow blade system to flow through the axial flow blade system in a plurality of radially separate paths of flow, there being a different number of rows of moving axial flow blading in different ones of said radially separate paths of flow.

12. In a turbine, two rotors adapted to rotate in opposite directions, each of said rotors carrying rings of blades cooperating with rings of blades of the other rotor to form a radial flow blade system and at least one of said rotors carrying a plurality of rows of blades adapted to cooperate with stationary blades to form an axial flow blade system, and means for causing motive fluid discharged from the radial flow blade system to flow through the axial flow blade system in a plurality of radially separate paths of flow, there being a different number of rows of moving axial flow blading in different ones of said radially separate paths of flow and the greatest number of rows of moving axial flow blading being in the radially innermost of said separate paths of flow.

13. In a turbine, two rotors adapted to rotate in opposite directions, each of said rotors carrying rings of blades cooperating with rings of blades of the other rotor to form a radial flow blade system and carrying a plurality of rows of blades adapted to cooperate with stationary blades to form an axial flow blade system and means for causing motive fluid discharged from the radial flow blade system to flow through the axial flow blade system in a plurality of radially separate paths of flow, there being a different number of rows of moving axial flow blading in different ones of said radially separate paths of flow and the greatest number of rows of moving axial flow blading being in the radially innermost of said separate paths of flow.

14. In a turbine, a plurality of rows of stationary guide blades, two rotors adapted to rotate in opposite directions, each of said rotors carrying rings of blades cooperating with rings of blades of the other rotor to form a radial flow blade system and at least one of said rotors carrying a plurality of rows of blades cooperating with some of said rows of stationary guide blades to form an axial flow blade system and means for causing motive fluid discharged from the radial flow blade system to flow through the axial flow blade system in a plurality of radially separate paths of flow, there being a different number of rows of moving axial flow blading in different ones of said radially separate paths of flow and the greatest number of rows of moving axial flow blading being in the radially innermost of said separate paths of flow, there being a single row of stationary guide blades between the radial flow blade system and the first row of moving axial flow blades in the radially innermost of said separate paths of flow and there being a plurality of rows of stationary guide blades between the radial flow blade system and the first row of moving axial flow blades in the outermost of said separate paths of flow.

15. In a turbine, a disc-like rotor, a plurality of rows of radial flow blades carried by said rotor axially to one side thereof and forming a part of a radial flow blade system, a plurality of rows of axial flow blades extending radially outwardly of said rotor and adapted to receive motive fluid discharged from said rows of radial flow blades, said rows of axial flow blades comprising a row of relatively long blades and a row of relatively short blades located between the relatively long blades and the radial flow blade system, and means for causing motive fluid discharged from the radial flow blade system to flow to the axial flow blade system in radially separated paths of flow comprising a first annular stationary member radially outside of said axial flow blades, a second annular stationary member located radially outside of and adjacent to the outer ends of said row of relatively short blades, a row of radially extending stationary guide blades between said annular stationary members and a second row of stationary guide blades extending in generally axial direction adjacent to the last row of blades in the radial flow blade system, the motive fluid flowing through the radially outermost of said separate paths being guided by both of said rows of stationary guide blades and the motive fluid flowing through the radially innermost of said paths of flow being guided by the second of said rows of guide blades.

ALF LYSHOLM.